(12) United States Patent
Erhardt et al.

(10) Patent No.: US 7,263,451 B1
(45) Date of Patent: Aug. 28, 2007

(54) METHOD AND APPARATUS FOR CORRELATING SEMICONDUCTOR PROCESS DATA WITH KNOWN PRIOR PROCESS DATA

(75) Inventors: Jeffrey P. Erhardt, San Jose, CA (US); Shivananda S. Shetty, Sunnyvale, CA (US); Paul J. Steffan, Elk Grove, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 67 days.

(21) Appl. No.: 10/973,181

(22) Filed: Oct. 25, 2004

(51) Int. Cl.
*G01N 37/00* (2006.01)
*G06K 9/00* (2006.01)

(52) U.S. Cl. ........................ 702/81; 382/145
(58) Field of Classification Search ............... 702/81; 382/141, 145, 149, 147; 700/110
See application file for complete search history.

(56) References Cited

U.S. PATENT DOCUMENTS

| | | | | |
|---|---|---|---|---|
| 4,893,346 A | * | 1/1990 | Bishop | 382/147 |
| 5,761,064 A | * | 6/1998 | La et al. | 700/110 |
| 6,081,659 A | * | 6/2000 | Garza et al. | 716/21 |
| 6,266,436 B1 | * | 7/2001 | Bett et al. | 382/141 |
| 6,314,379 B1 | * | 11/2001 | Hu et al. | 702/81 |
| 6,367,040 B1 | | 4/2002 | Ott et al. | |
| 6,389,323 B1 | * | 5/2002 | Yang et al. | 700/110 |
| 6,408,219 B2 | * | 6/2002 | Lamey et al. | 700/110 |
| 6,532,182 B2 | | 3/2003 | Ogawa et al. | |
| 6,741,941 B2 | * | 5/2004 | Obara et al. | 702/35 |
| 6,763,130 B1 | * | 7/2004 | Somekh et al. | 382/145 |
| 7,027,638 B2 | * | 4/2006 | Jun et al. | 382/149 |
| 2005/0220333 A1 | * | 10/2005 | Sakai et al. | 382/149 |

OTHER PUBLICATIONS

Merino et al., SmartBit: Bitmap to Defect Correlation Software for Yield Improvement, 2000 IEEE/SEMI Advanced Semiconductor Manufacturing Conference, pp. 194-198.*
Bichebois et al., Analysis of Defect to Yield Correlation on Memories: Method, Algorithms and Limits, 1997 IEEE, pp. 44-52.*
Wilson et al., Automatic In-Line to End-of-Line Defect Correlation Using FSRAM Test Structure for Quick Killer Defect Identification, Mar. 1994, Proc. IEEE 1994 Int. Conf. on Microelectronic Test Structures, vol. 7, pp. 160-163.*
Tobin et al., The Use of Historical Defect Imagery for Yield Learning, 2000 IEEE/SEMI Advanced Semiconductor Manufacturing Conference, pp. 18-25.*

* cited by examiner

*Primary Examiner*—Donald E. McElheny, Jr.
*Assistant Examiner*—Toan M. Le
(74) *Attorney, Agent, or Firm*—Mikio Ishimaru; William D. Zahrt, II

(57) ABSTRACT

A method for correlating semiconductor process data analyzes a semiconductor device that has been treated by a process, to produce process data related to the process. The data is converted into an image pattern, and automatic image retrieval is used to identify other devices having similar images. The process data is then correlated with prior process data of the other devices having the similar images.

20 Claims, 3 Drawing Sheets

METHOD AND APPARATUS FOR CORRELATING SEMICONDUCTOR PROCESS DATA WITH KNOWN PRIOR PROCESS DATA

BACKGROUND

1. Technical Field

The present invention relates generally to semiconductor technology and more specifically to semiconductor research, development, and production management.

2. Background Art

Electronic products are used in almost every aspect of life, and the heart of these electronic products is the integrated circuit. Integrated circuits are used a wide variety of products, such as televisions, telephones, and appliances.

Integrated circuits are made in and on silicon wafers by extremely complex systems that require the coordination of hundreds or even thousands of precisely controlled processes to produce a finished semiconductor wafer. Each finished semiconductor wafer has hundreds to tens of thousands of integrated circuits, each worth hundreds or thousands of dollars.

The ideal would be to have every one of the integrated circuits on a wafer functional and within specifications, but because of the sheer numbers of processes and minute variations in the processes, this rarely occurs. "Yield" is the measure of how many "good" integrated circuits there are on a wafer divided by the maximum number of possible good integrated circuits on the wafer. A 100% yield is extremely difficult to obtain because minor variations, due to such factors as timing, temperature, and materials, substantially affect a process. Further, one process often affects a number of other processes, often in unpredictable ways.

In a manufacturing environment, the primary purpose of experimentation is to increase the yield. Experiments are performed in-line and at the end of the production line with both production wafers and experimental wafers. However, yield enhancement methodologies in the manufacturing environment produce an abundance of very detailed data for a large number of wafers on processes subject only to minor variations. Major variations in the processes are not possible because of the time and cost of using production equipment and production wafers. Setup times for equipment and processing time can range from weeks to months, and processed wafers can each contain hundreds of thousands of dollars worth of integrated circuits.

The learning cycle for the improvement of systems and processes requires coming up with an idea, formulating a test(s) of the idea, testing the idea to obtain data, studying the data to determine the correctness of the idea, and developing new ideas based on the correctness of the first idea. The faster the correctness of ideas can be determined, the faster new ideas can be developed. Unfortunately, the manufacturing environment provides a slow learning cycle because of manufacturing time and cost.

Recently, the great increase in the complexity of integrated circuit manufacturing processes and the decrease in time between new product conception and market introduction have both created the need for speeding up the learning cycle.

This has been accomplished in part by the unique development of the integrated circuit research and development environment. In this environment, the learning cycle has been greatly speeded up and innovative techniques have been developed that have been extrapolated to high volume manufacturing facilities.

To speed up the learning cycle, processes are speeded up and major variations are made to many processes, but only a few wafers are processed to reduce cost. The research and development environment has resulted in the generation of tremendous amounts of data and analysis for all the different processes and variations. This, in turn, has required a large number of engineers to do the analysis. With more data, the answer always has been to hire more engineers.

However, this is not an acceptable solution for major problems. For example, during the production of semiconductor devices, in-line failure or defect inspections are conducted to obtain defect data about the devices. In-line defects are detected by inspection techniques conducted between process steps for fabricating the semiconductor devices. (Actual defects are determined later using electrical tests after the chip fabrication is completed.) The defect data is typically collected by laser scanning, optical, or scanning electron microscope ("SEM"). Defects may include a plurality of different events that may have very different respective impacts on chip yield. Any irregularities such as structural imperfections, particles, residuals, or embedded foreign material are considered as defects.

The inspection techniques often result in a total count of the number of defects detected in each process step, but not an abundance of in-depth or specific defect data. Total count information alone is not adequate for assigning good yield loss projections to defects detected at each particular process step.

It is common practice in the semiconductor industry, however, to inspect wafers at various times by employing inspection tools during production. The better the inspections, the better the data that can potentially shorten yield learning cycles by making it possible to react quickly to process problems. The process engineer therefore needs to know the number of defects per wafer, the x-y coordinates of each defect, and a set of parameters (different for different tools) specific for each particular defect. To obtain yield impact projections, it is then desirable to correlate the actual defect data to actual electrical failures. Such data can be crucial for maximizing yields of a product.

Speed is also critical for efficient manufacturing. Reviewing all the inspected defects, even using known automated classification, can significantly delay yield learning cycles and the subsequent manufacturing process for the semiconductor devices.

Therefore, a need exists for a system and method for correlating in-line defect data with prior known defect and yield data to determine a yield loss projection for each defect inspected wafer, and to suggest corresponding process anomalies associated with such defects so that appropriate process adjustments and corrections can be made.

Solutions to these problems have been long sought but prior developments have not taught or suggested any solutions and, thus, solutions to these problems have long eluded those skilled in the art.

DISCLOSURE OF THE INVENTION

The present invention provides a method for correlating semiconductor process data. A semiconductor device, that has been treated by a process, is analyzed to produce process data related to the process. The data is then converted into an image pattern. Automatic image retrieval is then used to identify other devices having similar images. The process data is then correlated with prior process data of the other devices having the similar images.

Certain embodiments of the invention have other advantages in addition to or in place of those mentioned above. The advantages will become apparent to those skilled in the art from a reading of the following detailed description when taken with reference to the accompanying drawings.

DETAILED DESCRIPTION OF THE INVENTION

Figure 1:
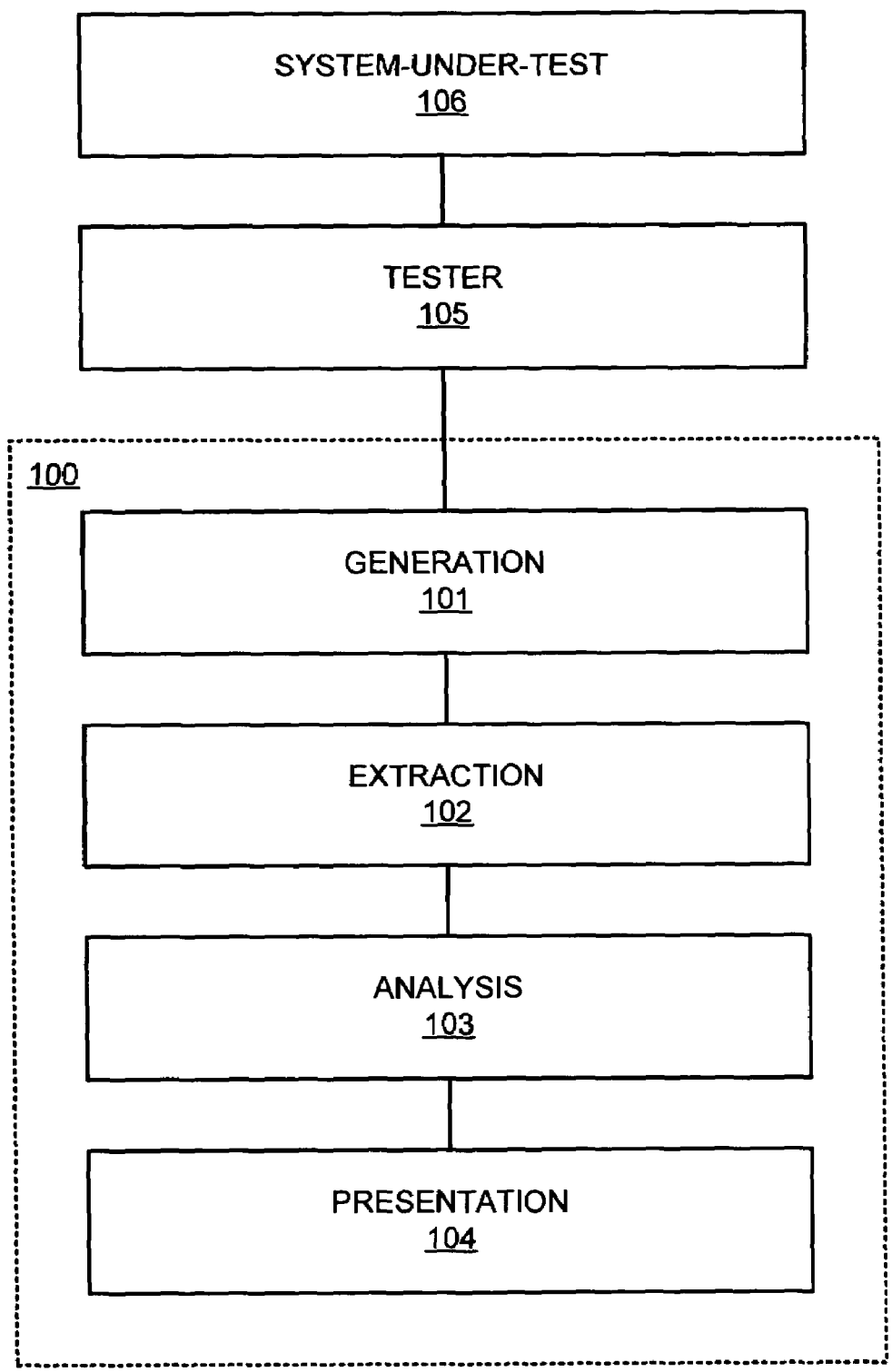
FIG. 1 is a block diagram of a tester information processing system according to the present invention.

Referring now to FIG. 1, therein is shown a block diagram of a tester information processing system 100 according to the present invention. The tester information processing system 100 is the result of the discovery that at times a single fundamental block can solve the problems presented but often there are four fundamental blocks to solving the problems presented.

The four fundamental blocks are a generation block 101, an extraction block 102, an analysis block 103, and a presentation block 104. Each of the blocks can stand independently in the tester information processing system 100, and within these blocks are various commercially available techniques, methodologies, processes, and approaches as well as the invention disclosed herein. The four fundamental blocks are discussed in the approximate chronology that the blocks are used in the tester information processing system 100.

The tester information processing system 100 includes various pieces of commercially available production, test, research, and development semiconductor equipment, which operate on and manipulate information and/or data, which are generically defined herein as "information". The tester information processing system 100 receives information from a tester 105, which is connected to a system-under-test 106.

In the integrated circuit field, the tester 105 can be a semiconductor test system for testing wafers or die and the system-under-test 106 can be anything from a complete wafer down to an element of an individual semiconductor device on a die.

In the generation block 101, basic information is generated looking at new and old products, new and old processes, product and process problems, unexpected or unpredictable results and variations, etc. Generation of the information may use the tester 105 itself, conventional test information, a personal computer, etc. It may also require new equipment and/or methods, which are described herein when required.

In the extraction block 102, usable information is extracted from the generated information from the generation block 101. Essentially, the generated information is translated into more useful forms; e.g., broken apart so it can be reassembled in different forms to show different inter-relationships.

For example, most testing equipment provides raw data in massive test files. Sometimes, millions of measurements provide millions of pieces of information, which must be digested and understood. The test files seldom have a user-friendly tabular output of parameter and value. Even where somewhat user-friendly outputs are provided, there are problems with the proper schema for storing the usable data and for formatting the data for subsequent analysis.

Extraction of the usable information may also require new equipment and/or methods. Sometimes, extraction includes storing the information for long duration experiments or for different experiments, which are described herein when required.

In the analysis block 103, the usable information from the extraction block 102 is analyzed. Unlike previous systems where a few experiments were performed and/or a relatively few data points were determined, the sheer volume of experiments and data precludes easy analysis of trends in the data or the ability to make predictions based on the data. Analysis of the extracted information may also require new equipment and/or methods, which are described herein when required.

In the presentation block 104, the analyzed information from the analysis block 103 is manipulated and presented in a comprehensible form to assist others in understanding the significance of the analyzed data. The huge amount of analyzed information often leads to esoteric presentations, which are not useful per se, misleading, or boring. Proper presentation often is an essential ingredient for making informed decisions on how to proceed to achieve yield and processing improvements. In some cases, problems cannot even be recognized unless the information is presented in an easily understood and digested form, and this often requires new methods of presentation, which are described herein when required.

In the production of semiconductor devices, each process step must be developed and stabilized as quickly as possible. It is therefore essential to perform failure analysis rapidly, efficiently, and effectively, so that the results of the failure analysis can facilitate quick repair of the process defect that caused the failure.

Various kinds of failure analysis are performed with respect to each individual semiconductor device. In one process, a "bitmap signature", or simply "bitmap", is generated in which the distribution condition of passes and failures is mapped and displayed in accordance with the arrangement of the subject semiconductor devices.

With the development of very large scale integration ("VLSI") devices, and ever larger and larger wafers, bitmaps have developed into data structures holding vast amounts of data. Identification of failure modes has become correspondingly more complicated. Furthermore, when analyzing the causes of the defects, the occurrence conditions must typically be analyzed for each individual fail bit. Therefore, as the bitmaps become larger, the bitmap processing time greatly increases, and analysis efficiency is correspondingly greatly reduced.

For example, a bitmap for a 128 MB semiconductor memory can require as much as 27 bytes to identify a particular bit address. If the semiconductor memory contains one KB of failed bits scattered across the chip, 27 KB of memory capacity will be required to record the bitmap. For a wafer having 260 chips, this then requires 675 KB, and for one lot of 50 wafers, 33 MB of memory capacity will be required. As such information accumulates for many lots over time, the relevant bitmap database becomes enormous. Consequently, a very large amount of computation time becomes necessary to extract the failure mode. Computational processes must often be repeated thousands upon thousands of times.

Figure 2:
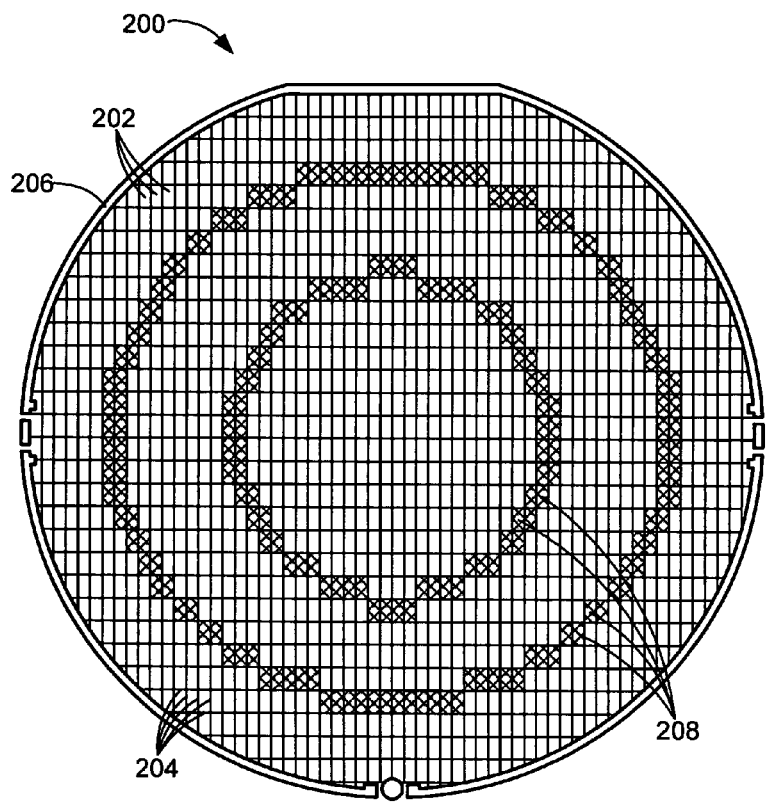
FIG. 2 shows a wafer 200 in an intermediate stage of manufacturing.

Referring now to FIG. 2, therein is shown a wafer 200 in an intermediate stage of manufacturing. Large numbers of dies 202, each having identical functional circuit patterns thereon, are located on the surface of the wafer 200. Each of the dies 202 is slightly separated from its neighboring dies by conventional scribe lines 204, to provide for individually separating the dies from the wafer 200 upon completion of the wafer manufacturing process. The edge of the wafer 200 along the periphery thereof is defined by a wafer edge area 206. Certain of the dies 202 have defects therein, and such dies are identified in the FIG. 2 by crosses 208 thereon.

In one wafer defect bitmap representational embodiment, the bitmap is displayed with a layout and appearance similar to the drawing of FIG. 2 herein. In some representational protocols of this type, as is known in the art, the level or degree of detail is much more extensive, so the drawing as shown in FIG. 2 will be understood to correspond to a simplified representation of those protocols.

Figure 3:
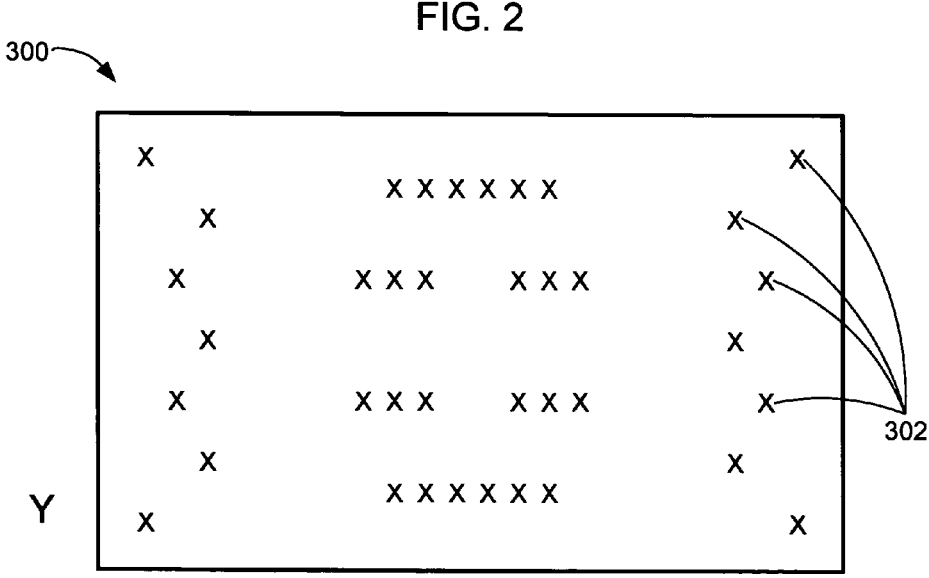
FIG. 3 is an X-Y bitmap of wafer defects.

Referring now to FIG. 3, therein is shown an X-Y bitmap 300 for a different wafer (not shown) having different defects than those in the wafer 200 (FIG. 2). In the X-Y bitmap 300, the locations of the defects are depicted on an X-Y grid in the locations designated by crosses 302 in the array that correlate to the die and defect locations on the related semiconductor wafer (not shown).

While the defect patterns in FIGS. 2 and 3 are depicted generally symmetrically, it will be understood that the variety of patterns in practice is as diverse as the production and process defects that lead to wafer die defects and their corresponding bitmap patterns. As an example, asymmetrical defect clustering (not shown) toward one side of a wafer might indicate an uneven exposure to etchant. Such uneven exposure to etchant might occur when a wafer is immersed into an etchant in a manner that exposes one side of the wafer to the etchant noticeably longer than the opposite side.

In the analysis of process-caused wafer defects, an important and frequently employed analytical tool is the comparison of bitmap signatures across multiple wafers and wafer lots. Bitmap analysis currently employs a manual classification process using a pre-defined set of classification codes. Unfortunately, such a bitmap analysis process is slow, computation intensive, potentially limiting, and often inaccurate. A need therefore continues for better methods and systems for easily, quickly, and accurately comparing bitmap signatures across multiple wafers and wafer lots.

In one embodiment according to the present invention, this need is met by using automatic image retrieval. Thus, instead of treating the bitmap information as a collection of data points (e.g., the points represented by the crosses 208 (FIG. 2) or the crosses 302 (FIG. 3)), the bitmap results are treated in a unified fashion as a single image. Using known automatic image retrieval ("A.I.R.") procedures, the image is then quickly and accurately compared with other images (stored, for example, in the analysis block 103 (FIG. 1)) of other bitmaps to identify other wafers or dies having similar patterns or signatures. This results in a quick and accurate comparison of bitmap signatures across multiple wafers and wafer lots, quickly identifying other wafers and wafer lots with similar process anomalies.

Thus, each wafer forms the system-under-test 106 (FIG. 1) that is being analyzed for defects by the tester 105. The tester 105 may be, for example, any semiconductor device testing equipment known and used for this purpose. The generated wafer defect data from the tester 105 is then processed in the generation block 101 and in the extraction block 102 to provide the defect bitmaps (e.g., the X-Y bitmap 300 (FIG. 3)).

In the analysis block 103, the defect bitmaps are converted into static images that are compared with other prior images using A.I.R. to identify other wafers or dies having similar defect patterns or signatures. The prior comparison images may be stored within the analysis block 103 or externally thereto, as appropriate. The stored data also associates the prior wafers or dies with the corresponding defects and process anomalies known to have occurred in these prior wafers or dies. In this manner, the A.I.R. quickly identifies these anomalies as the anomalies that are most likely to have lead to the defects in the current wafer under test.

The analytical results from the analysis block 103 are then output through the presentation block 104, thereby providing a quick, efficient, and accurate correlation of in-line defect data with prior known defect and yield data.

A method according to the present invention thus correlates semiconductor process data, such as wafer defect data, with known prior process data. The method thereby correlates related process signatures, such as bitmap signatures, of semiconductor devices that have been treated by a semiconductor manufacturing process. The correlation is accomplished by converting the process data into images and using A.I.R. to identify other devices having similar image patterns. The correlation then predicts that the causes of the current defects and process data correspond to the known causes for the other devices that have the similar image patterns.

Yield learning cycles are therefore accelerated by the present invention, defect causes are more quickly identified, and corrective yield impact projections are promptly and accurately generated. The corresponding manufacturing process problems are then corrected and optimized more quickly, and process yields are correspondingly improved more rapidly.

It will be readily understood, based upon this disclosure, that the same methodology and equipment of the present invention may also be used to analyze other semiconductor process data types that are currently treated as collections of individual data points. Examples include $V_t$ distributions, IV curves, and similar data point collections. The result is much faster and more accurate analyses that advantageously avoid current limitations such as manual classification, pre-defined (and thus potentially limiting) sets of classification codes, intensive computation, and so forth.

Figure 4:
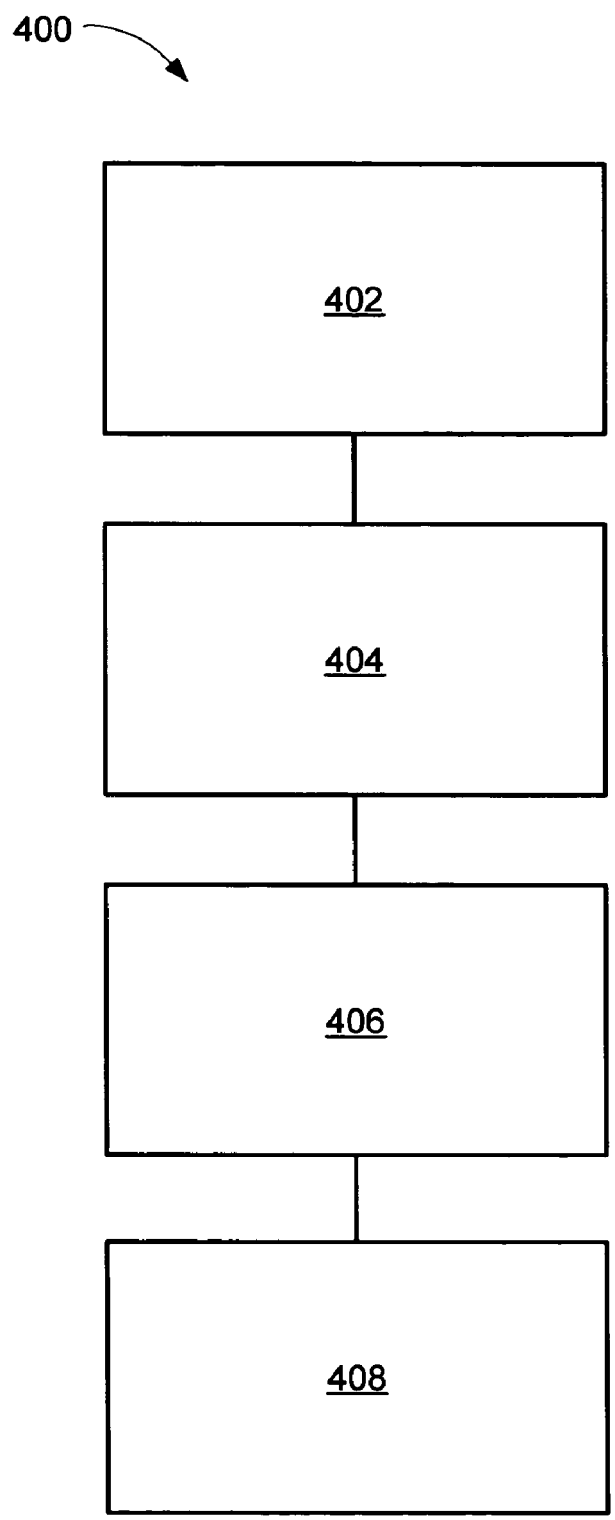
FIG. 4 is a flow chart of a method for correlating semiconductor process data with known prior process data in accordance with the present invention.

Referring now to FIG. 4, therein is shown a flow chart of a method 400 for correlating semiconductor process data in accordance with the present invention. The method 400 includes analyzing a semiconductor device, that has been treated by a process, to produce process data related to the process, in a block 402; converting the data into an image pattern in a block 404; using automatic image retrieval to identify other devices having similar images in a block 406; and correlating the process data with prior process data of the other devices having the similar images in a block 408.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the spirit and scope of the included claims. All matters hitherto-fore set forth or shown in the accompanying drawings are to be interpreted in an illustrative and non-limiting sense.

The invention claimed is:

1. A method for correlating semiconductor process data, comprising:
   analyzing a semiconductor device, that has been treated by a process, to produce process data related to the process;
   converting the data into an image pattern;
   using automatic image retrieval to identify other devices having similar images;
   correlating the process data with prior process data of the other devices having the similar images; and
   outputting the result of the correlation.

2. The method of claim 1 wherein using automatic image retrieval to identify other devices having similar images further comprises comparing the image pattern using image patterns from known prior data.

3. The method of claim 1 wherein the process data is a wafer defect bitmap.

4. The method of claim 1 further comprising identifying process anomalies by associating the process data with process anomalies known to occur in association with the similar images.

5. The method of claim 1 further comprising identifying yield data by associating the process data with yield data known to occur in association with the similar images.

6. A method for correlating semiconductor process data, comprising:
   analyzing a semiconductor wafer for defect data;
   converting the data into a static image pattern;
   using automatic image retrieval to identify other wafers having similar defect image patterns;
   correlating the process data of the semiconductor wafer with prior process data of the other wafers having the similar images; and
   outputting the result of the correlation.

7. The method of claim 6 wherein using automatic image retrieval to identify other wafers having similar defect image patterns further comprises comparing the static image pattern using image patterns from known prior data.

8. The method of claim 6 wherein the static image pattern is a wafer defect bitmap.

9. The method of claim 6 further comprising identifying process anomalies by associating the static image pattern with process anomalies known to occur in association with the similar defect image patterns.

10. The method of claim 6 further comprising identifying yield data by associating the static image pattern with yield data known to occur in association with the similar defect image patterns.

11. Apparatus for correlating semiconductor process data, comprising:
    means for analyzing a semiconductor device, that has been treated by a process, to produce process data related to the process;
    means for converting the data into an image pattern;
    means for using automatic image retrieval to identify other devices having similar images;
    means for correlating the process data with prior process data of the other devices having the similar images; and
    means for outputting the result of the correlation.

12. The apparatus of claim 11 wherein the means for using automatic image retrieval to identify other devices having similar images further comprises means for comparing the image pattern using image patterns from known prior data.

13. The apparatus of claim 11 wherein the process data is a wafer defect bitmap.

14. The apparatus of claim 11 further comprising means for identifying process anomalies by associating the process data with process anomalies known to occur in association with the similar images.

15. The apparatus of claim 11 further comprising means for identifying yield data by associating the process data with yield data known to occur in association with the similar images.

16. Apparatus for correlating semiconductor process data, comprising:
    means for analyzing a semiconductor wafer for defect data;
    means for converting the data into a static image pattern;
    means for using automatic image retrieval to identify other wafers having similar defect image patterns;
    means for correlating the process data of the semiconductor wafer with prior process data of the other wafers having the similar images; and
    means for outputting the result of the correlation.

17. The apparatus of claim 16 wherein the means for using automatic image retrieval to identify other wafers having similar defect image patterns further comprises means for comparing the static image pattern using image patterns from known prior data.

18. The apparatus of claim 16 wherein the static image pattern is a wafer defect bitmap.

19. The apparatus of claim 16 further comprising means for identifying process anomalies by associating the static image pattern with process anomalies known to occur in association with the similar defect image patterns.

20. The apparatus of claim 16 further comprising means for identifying yield data by associating the static image pattern with yield data known to occur in association with the similar defect image patterns.

* * * * *